(12) United States Patent
French et al.

(10) Patent No.: US 6,208,991 B1
(45) Date of Patent: Mar. 27, 2001

(54) DYNAMIC FILE MAPPING FOR NETWORK COMPUTERS

(75) Inventors: Steven Michael French; Chakkalamattam Jos Paul, both of Austin; James Richard Schoech, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,169

(22) Filed: Aug. 26, 1998

(51) Int. Cl.[7] .................................................. G06F 15/173
(52) U.S. Cl. ................................. 707/10; 707/9; 709/203; 709/219; 709/225; 709/229; 713/201; 713/202
(58) Field of Search .................................. 707/10, 9, 201; 709/203, 225, 219, 229, 239

(56) References Cited

U.S. PATENT DOCUMENTS

| | | | | |
|---|---|---|---|---|
| 5,732,214 | * | 3/1998 | Subrahmanyam | 709/227 |
| 5,796,952 | * | 8/1998 | Davis et al. | 709/224 |
| 5,875,327 | * | 2/1999 | Brandt et al. | 395/651 |
| 5,926,637 | * | 7/1999 | Cline et al. | 395/701 |
| 5,974,572 | * | 10/1999 | Weinberg et al. | 714/47 |
| 6,018,745 | * | 1/2000 | Kuftedjian | 707/200 |
| 6,029,168 | * | 2/2000 | Frey | 707/10 |
| 6,061,795 | * | 5/2000 | Dircks et al. | 713/201 |
| 6,070,242 | * | 5/2000 | Wong et al. | 713/201 |

* cited by examiner

Primary Examiner—Jean R. Homere
(74) Attorney, Agent, or Firm—Jeffrey S. LaBaw; Felsman, Bradley, Vaden, Gunter & Dillon, LLP

(57) ABSTRACT

File mappings are dynamically loaded within an operating data processing system appended to existing file or directory mappings during operation rather than being loaded during system initialization. A triggering event, such as a user logging into a network from the data processing system with a unique userid, initiates the process for selectively loaded the dynamic file mappings. A context variable, such as the userid of the user logging into the network, is employed to select the set or table of file mappings which are dynamically loaded. The dynamically loaded file mappings are appended to traditional, machine-specific file mappings loaded at system initialization and may be unloaded without affecting such traditional file mappings. The capability of dynamic file mapping allows single-user applications, those designed for use by only one user at a time, to be shared from a single network location, with user-specific files mapped to different locations for different users. Thus, only one copy of a browser is required in a network computer environment. Sensitive files, such as bookmark, security, and cookie files, are dynamically mapped to a user-specific directory based on the userid regardless of the user unit from which the user logs in. Multiple users may share a single copy of the single user browser, and users may "roam" the network, logging in at any data processing system.

10 Claims, 4 Drawing Sheets

DYNAMIC FILE MAPPING FOR NETWORK COMPUTERS

BACKGROUND OF THE INVENTION

1. Technical Field

The present invention relates in general to application file management within data processing systems and in particular to application- and user-specific file mapping within data processing systems or networks. Still more particularly, the present invention relates to user-based dynamic file mapping allowing sharing of single-user applications.

2. Description of the Related Art

Applications may be stored on network servers and run from workstations connected to the network. Different users authorized access to the network may run the application remotely from different workstations connected to the network. In the best cases, however, significant duplication of files is typically required. In some cases, a complete copy of the application for each user must be stored on the server.

Currently, the only mechanisms available for transparently remapping application files are machine-specific. Unix's symbolic links, for example, allow a dummy filename to be mapped to a secondary location, but only in a machine-specific fashion. PC RIPL (Remote Boot) FileIndirectionTables are also machine-specific and are loaded at boot time. Distributed File System (DFS) implements "referrals," which provide static directory mapping, which is constant across all machines and users.

Machine-specific file remappings typically cannot handle the case of configuration files. Single user applications—i.e. applications which are not designed for concurrent use by multiple users—include configuration files containing user preferences, cache or data files storage locations, etc. Such configuration files are user specific and typically should be stored in different, access-restricted directories.

It would be desirable, therefore, to provide a mechanism for dynamically remapping files associated with single user applications in a machine-independent fashion.

SUMMARY OF THE INVENTION

It is therefore one object of the present invention to provide an improved method and apparatus for application file management within data processing systems.

It is another object of the present invention to provide an improved method and apparatus for application- and user-specific file mapping within data processing systems or networks.

It in yet another object of the present invention to provide a method and apparatus for user-based dynamic file mapping allowing sharing of single-user applications.

The foregoing objects are achieved as is now described. File mappings are dynamically loaded within an operating data processing system appended to existing file or directory mappings during operation rather than being loaded during system initialization. A triggering event, such as a user logging into a network from the data processing system with a unique userid, initiates the process for selectively loading the dynamic file mappings or reloading new dynamic file mappings. A context variable, such as the userid of the user logging into the network, is employed to select the set or table of file mappings which are dynamically loaded. The dynamically loaded file mappings are appended to traditional, machine-specific file mappings loaded at system initialization and may be unloaded without affecting such traditional file mappings. The capability of dynamic file mapping allows single-user applications, those designed for use by only one user at a time, to be shared from a single network location, with user-specific files mapped to different locations for different users. Thus, only one copy of a browser is required in a network computer environment. Sensitive files, such as bookmark, security, and cookie files, are dynamically mapped to a user-specific directory based on the userid regardless of the user unit from which the user logs in. Multiple users may share a single copy of the single user browser, and users may "roam" the network, logging in at any data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
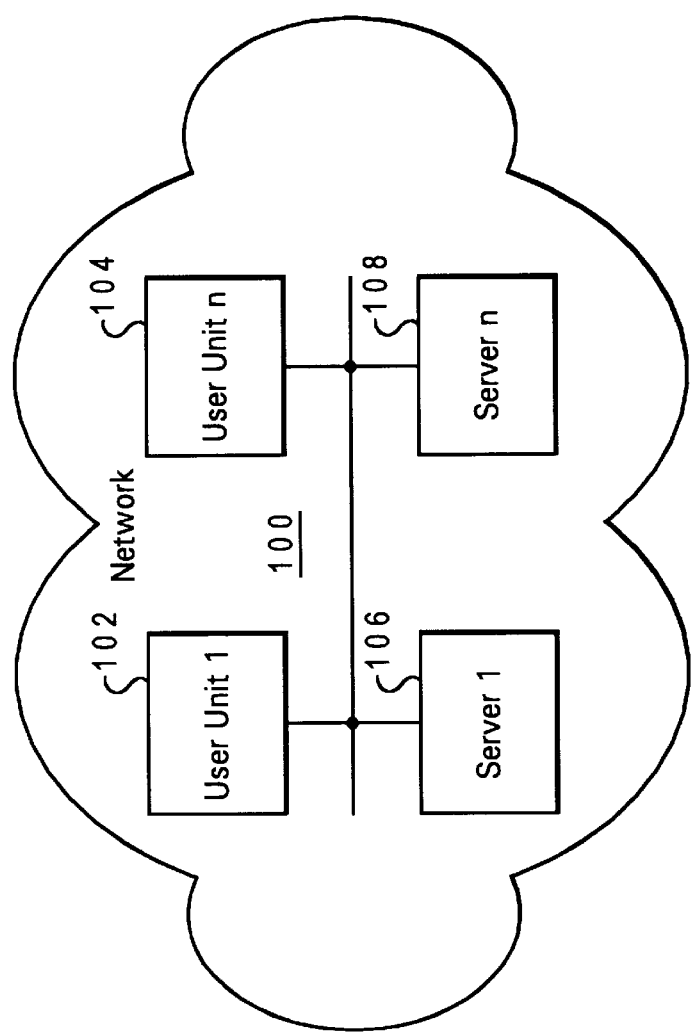
FIGS. 1A and 1B depict physical and functional block diagrams of a data processing system network in accordance with a preferred embodiment of the present invention.
Figure 1B:
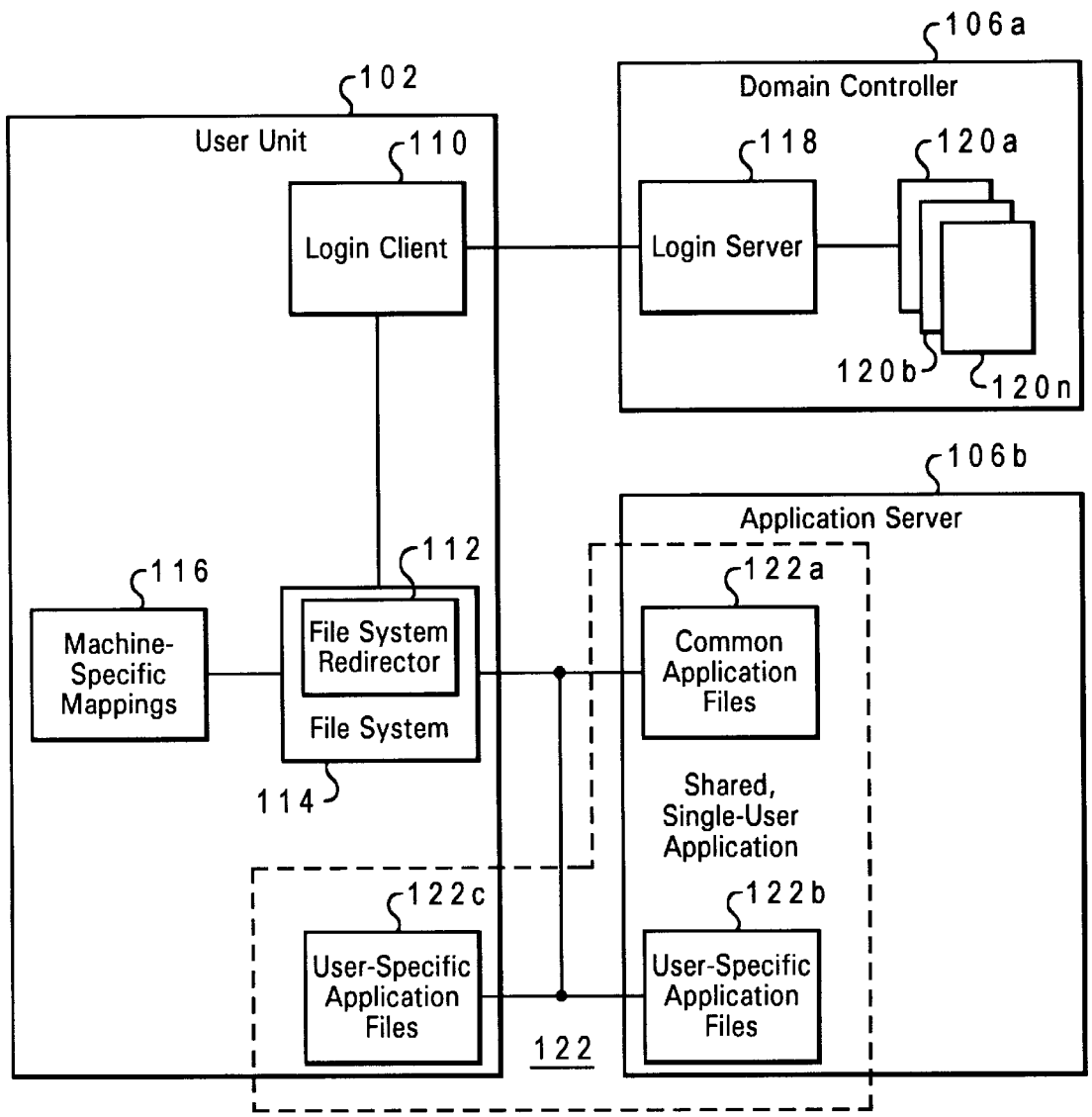

With reference now to the figures, and in particular with reference to FIGS. 1A–1B, physical and functional block diagrams of a data processing system network in accordance with a preferred embodiment of the present invention is depicted. FIG. 1A depicts the physical components of network 100, which is preferably a local area network (LAN) of one of various types known in the art (Ethernet, etc.). Network 100 in the exemplary embodiment includes a plurality of user units 102 and 104 and a plurality of servers 106 and 108. The present invention may be employed with only a single user unit and a single server, and the user unit and the server unit may be colocated. However, the benefits of the present invention may best be obtained within a network including a plurality of user units and at least one server. User units 102 and 104 and servers 106 and 108 are all data processing systems interconnected by a network communications systems in accordance with the known art.

FIG. 1B depicts a functional block diagram of the network components comprising the present invention. Each user unit within network 100 supporting dynamic file remapping in accordance with the present invention, such as user unit 102 in the depicted example, includes a login client application 110 and a file system redirector 112. File system redirector 112, which preferably forms part of the file system 114, may be integrated into the operating system (together with the file system) of user unit 102 in accordance with the known art. User unit 102 may optionally include a machine-specific set 116 of file or directory mappings as known in the art, such as the mappings which are utilized to permit access to a shared disk drive within network 102.

Server 106 includes a login server 118 and one or more sets 120a–120n of dynamic or user-specific file/directory mappings. User-specific sets of file and/or directory mappings 120a–120n may be of the same type and form as conventional machine-specific file mappings 116 known in the art, and may be loaded or employed by file redirector 112 and file system 114 in the same manner. In the present invention, however, the cause for loading and setting the additional file mappings and the selection of a particular set of file mappings differs from the prior art, as described in further detail below. Server 106 also includes a shared, single-user application 122. Single user application 122 may be any conventional application designed for use by only one user at a time, as opposed to multi-user applications which allow multiple users to concurrently share the application. Although the exemplary embodiment depicts login server 118 and single user application 122 as stored within a single server 106, these components may be stored on separate servers within the network. In fact, different portions of single user application 122 may be stored on separate servers as described in further detail below.

The client or user unit 102 may obtain four items from one or more server units 106 within a network: (a) the application program; (b) the application data, which may be user-specific and need not be colocated on the server unit(s) for the application program; (c) user-based file mappings; and (d) machine-based file mappings. The user-based file mappings are preferably retrieved from a central logon server (more commonly referred to as a "domain controller") or its backup logon server. These user-based file mappings may be employed to transparently locate the application data for a particular user. The machine-based (or "machine-specific") file mappings are optional and may be obtained either locally or from a server unit, but preferably from a network boot server.

While the exemplary embodiment suggests that the application program, application data, and user-based file mappings are colocated in the same server unit 106, those skilled in the art will recognize that, in practice, the application program and the user-based (or "user-specific") file mappings would rarely be colocated on the same server unit.

In the present invention, login client 110 is employed to establish a functional connection between user unit 102 and network 100, submitting a request to login server 118 together with a userid and password as is known in the art. User-specific file mapping tables 120a–120n are stored at a location within server 106 known to the domain controller within logon authentication server application 118, When a user employs logon client 110 to connect to server 106, the client logon code within user unit 102 queries server 106 for user-specific mapping information. Server 106 determines whether a user-specific mapping table within tables 120a–120n corresponds to the logon id supplied by the user logging on. If so, the appropriate user-specific file mappings are returned to user unit 102 by login server 118. In an alternative implementation of the present invention, the login client 110 would retrieve the user-specific mapping information directly (e.g. using redirected file i/o) from a well known, user-specific location on the domain controller or backup domain controller.

User-specific file mappings returned by the logon authentication server application 118 are established for user unit 102, appended to the currently active file mapping information in the client-side file system redirector 112 within user unit 102. These user-specific file mappings remain in effect and are employed by the file system redirector 112 within user unit 102 until the user logs off that data processing system. When the user logs off a particular user unit, the user-specific file mappings are unloaded without affecting other remapping information within user-unit 102, such as machine specific file mappings 116 loaded at system initialization to establish a connection to network 100 via a network interface card for submitting login requests. Another set of file mappings may than be loaded for the next user that logs on to network 100 from user unit 102 with a different userid.

An example of a suitable single user application 122 is Netscape Navigator version 2 available from Netscape Communications Corporation of Mountain View, Calif. (Netscape Communicator, which is version 4 of the Netscape browser application, is a multi-user application). The present invention may be utilized for sharing a single-user Netscape Navigator application among various users in a network computer (NC) environment.

In the prior art, in order to support user-specific preferences, bookmarks, and caching, a unique copy of Netscape Navigator would be required on each user-unit employed by only a single user or in each user's home directory on the network. With the present invention, a single copy of most of the Netscape Navigator application's files are stored in a single shared server directory. Some files, such as the Web page cache, are remapped to a machine specific directory while the remaining files, such as the bookmarks file (BOOKMARK.HTM), the Netscape configuration file (NETSCAPE.INI), security files and the cookie cache, are dynamically mapped to another location depending on the identity of the user logged on. This protects the user's sensitive security and cookie data and user preferences even as if the user "roams" from user unit to user unit within the network or if multiple users share the same user unit.

As illustrated by the example described above, the dynamic file remapping of the present invention allows the application files of single-user application 122 to effectively be distributed among a plurality of data processing systems, or within different directories, depending on the user. A single copy of common application files 122a, such as the executables, may be stored in a single directory and shared among a plurality of users. User-specific application files 122b, such as security-sensitive bookmark and cookie files, may be stored in a different location, with different sets of user-specific application files 122b mapping to the directory and file designation for those files within single user application 122, depending upon the identity of the user. Finally, non-sensitive user-specific application files 122c, such as cached Web pages, may be stored in yet another location, including within either user unit 102 or server 106. User specific files may be mapped to different locations for security or reliability purposes as well. For example, the netscape bookmark file may be mapped to a read-only directory with other read-only configuration files for this user. These read-only files may be more easily replicated from a common location, and the user will be unable to accidently corrupt these files through user error. Similarly, files such as the Netscape security files such as cookie files can be mapped to a read-write location. User specific files may be transparently mapped to common locations for groups of users as well (usually for read only configuration files). File or directory mappings for all such application files forming part of a conventional, single-user application may be dynamically specified based on the userid of the user.

Although the dynamic file mapping technique of the present invention provides greater benefit in conjunction with single-user applications, value may still be provided from use with multi-user applications. For instance, dynamic file mapping provides greater ease of use (since user specific files can more easily be cloned and these files can even be mapped to common locations across a set of similar users of the applications. In addition, dynamic file mapping can provide significant savings in disk space even for multiuser applications since only the minimum set of non-shared files need be remapped to user specific areas, and some can be shared by classes of users of the application. Accordingly, the present invention may also be employed with more recent versions of the Netscape browser, and other multi-user applications.

Figure 2:
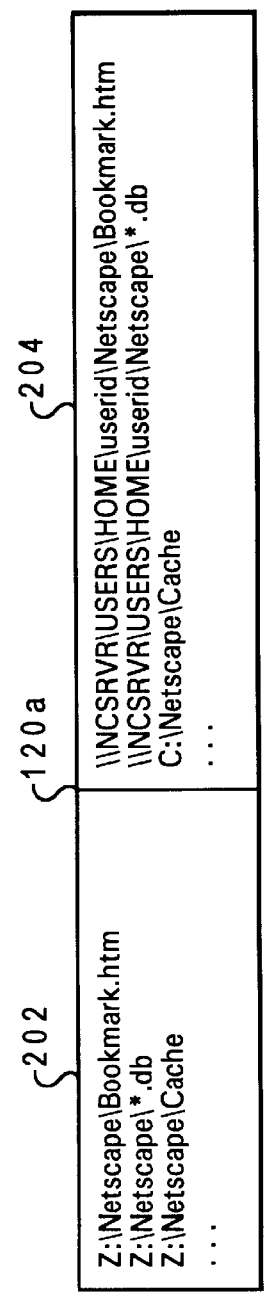
FIG. 2 is a user-specific mapping table for dynamic file mapping in accordance with a preferred embodiment of the present invention.

Referring now to FIG. 2, a user-specific mapping table for dynamic file mapping in accordance with a preferred embodiment of the present invention is illustrated. File mapping table 120a includes two columns. The first column 202 contains the client-side view of source directory or path of the files employed by the shared, single-user application. At least three types of source paths may be specified: explicit directory paths and file names, such as Z:\Netscape\Bookmark.htm; directory paths and wildcards, such as Z:\Netscape\*.db; and directory names, such as Z:\Netscape\Cache.

The second column 204 of user-specific mapping table 120a contains the corresponding location of the files specified by name or directory path in column 202. The files may be located on either a server or the user unit. When the client file system requests a file within a mapped directory path and/or filename, the requested file is obtained from the user-specific location on the server rather than from the drive specified. Each user will have a different directory, preferably based on the specific userid of that user, such as a directory path including the userid.

For a specific subset of users, a file can be mapped to the same location, by specifying the same target location in the file mapping table. For example, half of the users in the organization could share the same Netscape bookmark file from a read-only location on the network, and the other half of the users each could have their own read-write copy stored in a user specific location.

Figure 3A:
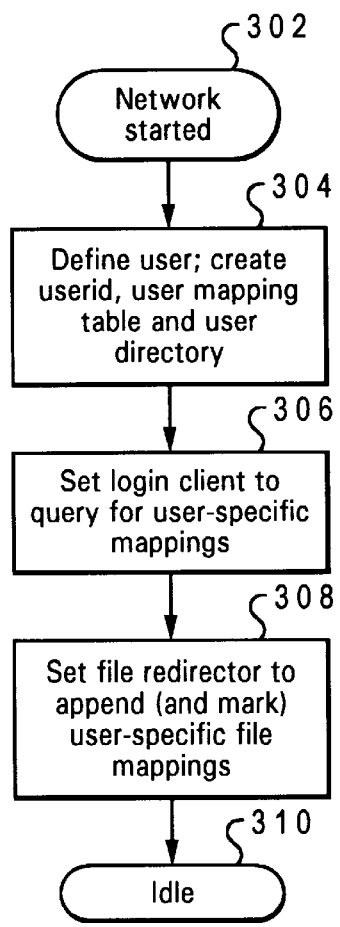
FIGS. 3A and 3B depict high level flowcharts for processes of establishing and employing dynamic file mapping in accordance with a preferred embodiment of the present invention.
Figure 3C:
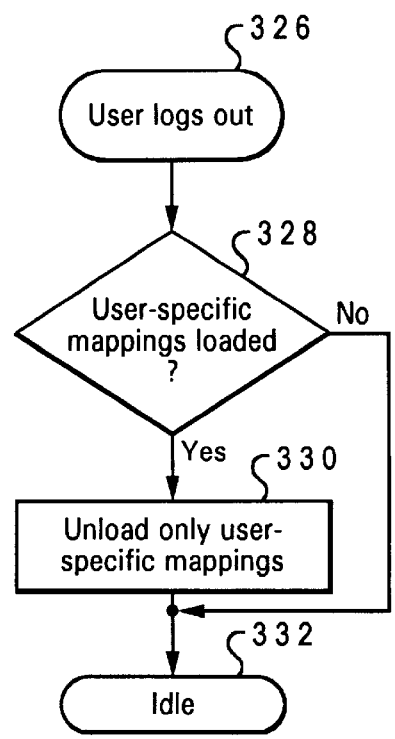
Figure 3B:
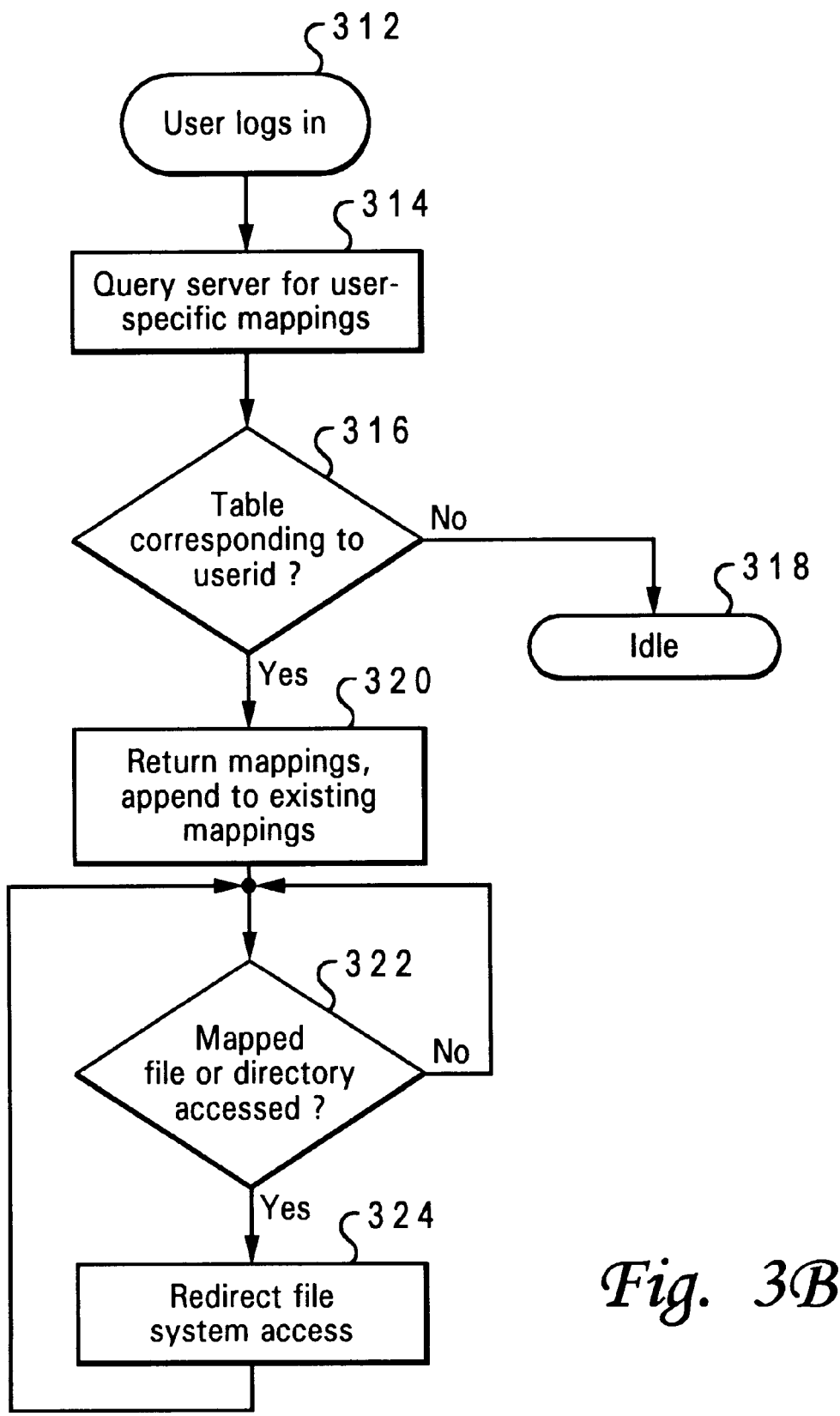

With reference now to FIGS. 3A–3B, high level flowcharts for processes of establishing and employing dynamic file mapping in accordance with a preferred embodiment of the present invention are depicted. FIG. 3A depicts a process of establishing dynamic file mapping. The process begins at step 302, which depicts a network being formed with at least one client data processing system, or user unit, and at least one server data processing system, with a login client and server for providing functional connection of the user unit to the server.

The process next passes to step 304, which illustrates defining a user for the network, including creating a userid for the user, creating a user-specific file mapping table at a location known to the login server, and user-specific directorial, if necessary. The process then passes to step 306, which depicts setting the login client on the user unit to query for user-specific file mappings during the login routine. The process next passes to step 308, which illustrates setting the file redirector to append or otherwise integrate user-specific file mappings to existing file mappings in the client data processing system network filesystem. The process then passes to step 310, which depicts the process becoming idle until the invention is to be implemented in another network.

FIG. 3B depicts a process of setting and employing dynamic file mappings in accordance with a preferred embodiment of the present invention. The process begins at step 312, which illustrates a user logging into the network at the client data processing system utilizing a userid and password in accordance with the known art. The process next passes to step 314, which illustrates the login client querying the login server for user-specific file mappings, and then to step 316, which depicts a determination by the login server of whether a table of user-specific file mappings corresponding to the provided userid exists.

Although the exemplary embodiment depicts the attempt to dynamically load file mappings as being triggered by a user logging in, other triggering events may be employed instead. For example, the start of an application employing dynamically mapped files may be employed as a triggering event. Furthermore, the userid is only one possible context variable utilized to select particular file mappings to be loaded. Other context variables may be utilized in addition to or in lieu of the userid for selecting a particular set of file mappings to be loaded, such as the data processing system id, an application identifier or type, and the like. The present invention applies equally regardless of triggering event or context variable utilized to automatically initiate dynamic file mapping and to select particular file mapping sets, provided that rebooting the client system is not required to integrate the dynamic file mappings within the filesystem redirector and that the dynamic file mappings are loaded and unloaded without affecting traditional or machine-based file mappings.

If no table of user-specific file mappings is found, the process proceeds to step 318, which depicts the process becoming idle until another user logs in to the network. If a corresponding table is found, however, the process proceeds instead to step 320, which illustrates the server returning the file mappings to the user unit, which appends them to existing file mappings within the user unit without disturbing the existing file mappings.

The process then passes to step 322, which depicts a determination by the file system redirector of whether a dynamically mapped file or directory has been accessed. If not, the process returns to step 322 and continues polling for attempts to access a dynamically mapped file or directory. If an attempt to access the dynamically mapped files or directories is made, the process proceeds instead to step 324, which illustrates redirecting the attempted file system access to the dynamically mapped location. The portion of the process depicted in steps 322 and 324 continues until interrupted or killed by an external process.

FIG. 3C depicts a process of unloading dynamically loaded file mappings in accordance with the present invention. The process begins at step 326, which depicts to occurrence of a triggering event such as the user logging out of the network. The process then passes to step 328, which illustrates a determination of whether any dynamically loaded file mappings are presently loaded. Some means for distinguishing dynamically loaded file mappings from traditional, machine-specific file mappings, such as a flag or attribute associated with dynamically loaded file mappings, is required for this purpose.

If at least one dynamically loaded file mapping is identified, the process proceeds to step 330, which depicts unloading only the dynamic file mappings, without disturbing other file mappings, and the process then proceeds to step 332. If no dynamic file mappings are loaded, however, the process proceeds instead directly to step 332, which illustrates the process becoming idle until another triggering event for unloading dynamic file and directory mappings is detected.

The present invention adds the capability of user-based file re-mappings which may be loaded at any time. The mappings are transparently integrated with traditional (machine-based) file mappings by the client network file-system. This provides the necessary support for allowing a single-user application to be shared by multiple users while providing user-specific file support and protecting the security of such user-specific files. The file mappings established by the present invention are dynamic, and may be loaded or unloaded and replaced without reinitializing the client data processing system by logging in and logging out with different userids.

It is important to note that while the present invention has been described in the context of a fully functional data processing system or network, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: nonvolatile, hard-coded type media such as read only memories (ROMs) or erasable, electrically programmable read only memories (EEPROMs), recordable type media such as floppy disks, hard disk drives and CD-ROMs, and transmission type media such an digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of dynamic file mapping, comprising:
    storing an application on a first server and a plurality of sets of user-specific file mappings on a second server within a network;
    responsive to a user logging into the network, determining a userid for the user;
    determining whether a set of user-specific file mappings is associated with the userid;
    responsive to determining that a set of user-specific file mappings is associated with the userid, loading the set of user-specific file mappings;
    responsive to the user executing the application, utilizing the user-specific file mappings to redirect file calls from the application.

2. The method of claim 1, wherein the step of storing an application on a first server and a plurality of sets of user-specific file mappings on a second server within a network further comprises:
    storing a plurality of sets of user-specific file mappings for the application on the second server.

3. The method of claim 1, wherein the step of storing an application on a first server and a plurality of sets of user-specific file mappings on a second server within a network further comprises:
    storing a single-user application on the first server for execution by a plurality of users.

4. The method of claim 1, further comprising:
    loading at least one machine-specific file mapping in addition to the set of user-specific file mappings.

5. The method of claim 1, further comprising:
    responsive to the user logging out of the network, unloading only the set of user-specific file mappings.

6. A mechanism for dynamic file mapping, comprising:
    an application server containing an application;
    a domain controller containing a plurality of sets of user-specific file mappings;
    a user unit connected to the application server and the domain controller to form a network, wherein the network further comprises a logon routine:
        determining a userid for a user in response to the user logging into the network;
        determining whether a set of user-specific file mappings is associated with the userid; and
        loading the set of user-specific file mappings in the user unit in response to determining that a set of user-specific file mappings is associated with the userid,
    wherein the user unit, responsive to the user executing the application, utilizes the user-specific file mappings to redirect file calls from the application.

7. The mechanism of claim 6, wherein the sets of user-specific file mappings further comprise:
    user-specific file mappings for the application.

8. The mechanism of claim 6, wherein the application further comprises:
    a single-user application accessible for execution by a plurality of users.

9. The mechanism of claim 6, wherein the user unit loads at least one machine-specific file mapping in addition to the set of user-specific file mappings.

10. The mechanism of claim 6, wherein the network further comprises:
    a logout routine unloading only the set of user-specific file mappings from the user unit in response to the user logging out of the network.

* * * * *